United States Patent
Biggs et al.

(10) Patent No.: US 12,327,280 B2
(45) Date of Patent: Jun. 10, 2025

(54) METHOD AND SYSTEM FOR OUTFIT SIMULATION USING LAYER MASK

(71) Applicant: Amazon Technologies, Inc., Seattle, WA (US)

(72) Inventors: Benjamin James Biggs, San Francisco, CA (US); Philip Pinette, Seattle, WA (US); Charu Kothari, San Jose, CA (US); Caitlin Isaac Cagampan, Pasadena, CA (US); Gerard Guy Medioni, Los Angeles, CA (US); Achal Dushyant Dave, San Francisco, CA (US); Scott Chenghui Sun, Milpitas, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 294 days.

(21) Appl. No.: 18/067,597

(22) Filed: Dec. 16, 2022

(65) Prior Publication Data
US 2024/0202809 A1    Jun. 20, 2024

(51) Int. Cl.
*G06Q 30/00* (2023.01)
*G06Q 30/0601* (2023.01)
(Continued)

(52) U.S. Cl.
CPC ..... *G06Q 30/0643* (2013.01); *G06Q 30/0629* (2013.01); *G06T 11/00* (2013.01); *G06T 19/20* (2013.01); *G06V 10/22* (2022.01)

(58) Field of Classification Search
CPC ........... G06Q 30/0643; G06Q 30/0631; G06Q 30/0623; G06Q 30/0627; G06Q 30/0601; G06Q 30/0621–0629; G06T 17/00; G06T 7/10; G06T 15/00; G06T 15/04; G06T 15/10; G06T 2210/16; G06T 2219/2004;
(Continued)

(56) References Cited

U.S. PATENT DOCUMENTS

| | | | |
|---|---|---|---|
| 11,200,689 B1* | 12/2021 | Smith | G06T 17/00 |
| 12,079,961 B2* | 9/2024 | Song | G06T 11/60 |

(Continued)

OTHER PUBLICATIONS

Aiyu Cui, Daniel McKee, Svetlana Lazebnik, "Dressing in Order: Recurrent Person Image Generation for Pose Transfer, Virtual Try-On and Outfit Editing," Oct. 18, 2022, University of Illinois at Urbana-Champaign, pp. 1-19 (Year: 2022).*
(Continued)

*Primary Examiner* — Marissa Thein
*Assistant Examiner* — Zachary T. Shuckrow
(74) *Attorney, Agent, or Firm* — K&L Gates LLP

(57) ABSTRACT

A method includes generating a virtual model of a human body based at least in part on a selected image of the human body and generating a segment of an article of clothing based at least in part on a selected image of the article of clothing. The method also includes generating a layer mask indicating whether a plurality of output pixels of an output image should be produced according to the image of the human body, the image of the shirt, or the image of the pair of pants and producing the plurality of output pixels of the output image according to the layer mask. The output image shows the article of clothing on the human body in the selected image of the human body.

14 Claims, 12 Drawing Sheets

(51) Int. Cl.
*G06T 11/00* (2006.01)
*G06T 19/20* (2011.01)
*G06V 10/22* (2022.01)

(58) Field of Classification Search
CPC ........ G06T 19/20; G06V 10/22; G06V 10/82; G06V 40/103
USPC ........ 705/27.2; 345/698, 419, 582, 581, 589
See application file for complete search history.

(56) References Cited

U.S. PATENT DOCUMENTS

| | | | |
|---|---|---|---|
| 12,100,156 B2* | 9/2024 | Dudovitch | G06F 18/2155 |
| 2020/0151807 A1* | 5/2020 | Zhou | G06N 3/045 |
| 2021/0142539 A1* | 5/2021 | Ayush | G06N 3/08 |
| 2021/0241531 A1 | 8/2021 | Lee et al. | |
| 2022/0318892 A1* | 10/2022 | Lee | G06Q 30/0643 |

OTHER PUBLICATIONS

Demo/Looklet Dressing Room, retrieved Dec. 15, 2022, <https://dressing-room.looklet.com/>.
Grigorev et al.; Coordinate-based Texture Inpainting for Pose-Guided Human Image Generation; 2019 IEEE/CVF Conference on Computer Vision and Pattern Recognition (CVPR), IEEE; Jun. 15, 2019; pp. 12127-12136.
Pomocka; International Search Report of PCT/US2023/081339; Apr. 15, 2024; 6 pgs.

* cited by examiner

METHOD AND SYSTEM FOR OUTFIT SIMULATION USING LAYER MASK

BACKGROUND

The present disclosure relates to clothing, and more specifically, to fitting outfits with articles of clothing on a person's body. One challenge of purchasing clothes online is that when browsing a clothing catalog, a user is limited to viewing different images of the different articles of clothing on different models, which may not present an accurate representation of how the articles of clothing will look when assembled into an outfit or how the outfit will look when worn by the particular user.

DETAILED DESCRIPTION

The present disclosure describes an outfit simulation feature that allows a user to see, on a device, how an outfit with multiple articles of clothing will look before purchasing the outfit online or in a physical store. The device may receive multiple images of articles of clothing and images of models with different body types. The device then uses multiple neural networks to simulate the fit and appearance of different combinations of the articles of clothing on the models.

Specifically, for a combination of two articles of clothing (e.g., shirt and pants) and a model, the device produces an output image of the model wearing the two articles of clothing. By viewing the output image, the user may see how the articles of clothing look when assembled into an outfit and how the outfit looks when worn by a person (e.g., a person with a body type similar to the user's body type). As a result, the device improves the accuracy and realistic look of the outfit on the model, which may allow the user to make a more informed outfit purchase and which may reduce waste caused by returns, in certain embodiments.

Figure 1:
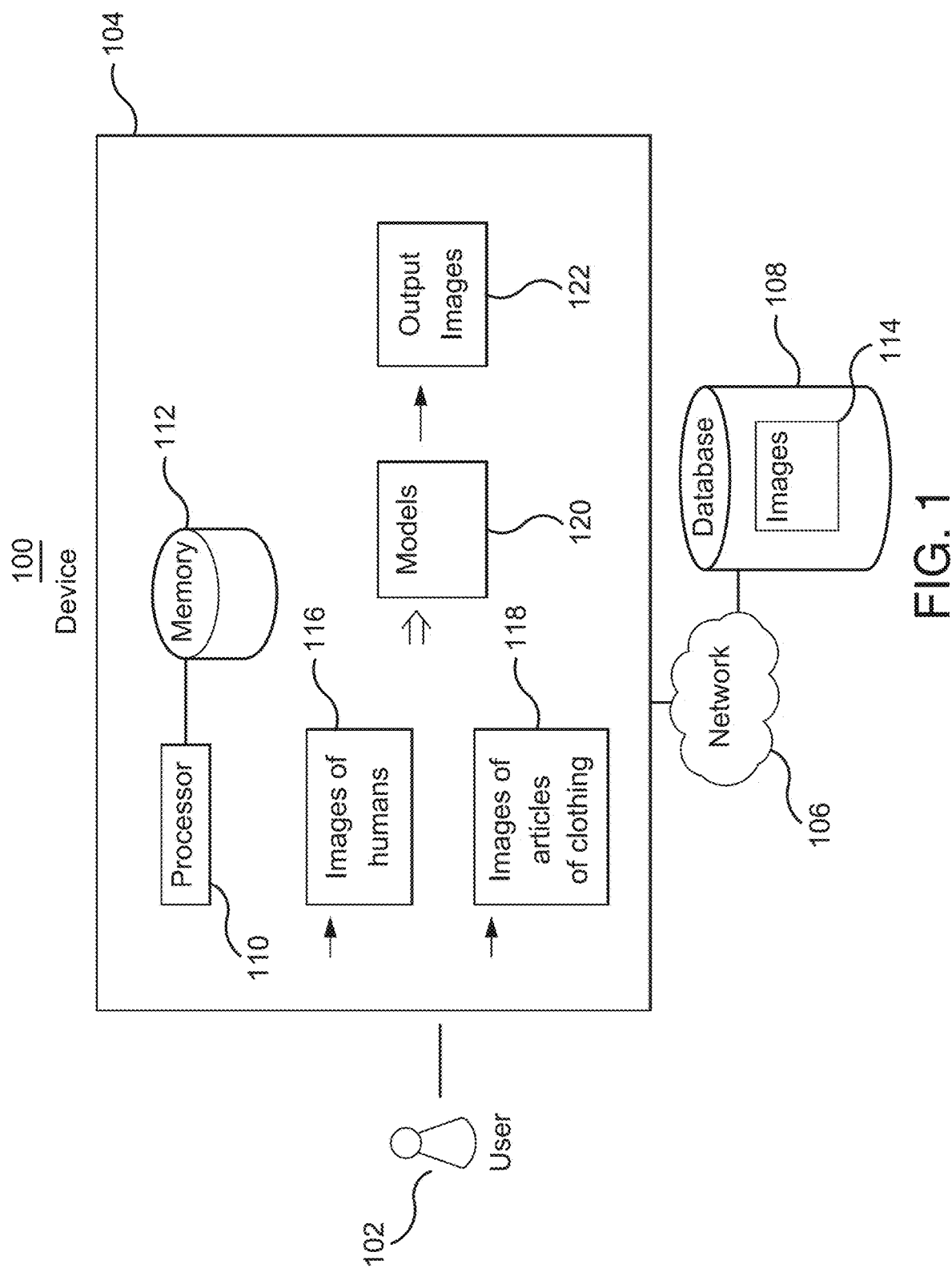
FIG. 1 illustrates an example system.

FIG. 1 illustrates an example system 100. As seen in FIG. 1, the system 100 includes a device 104, a network 106, and a database 108. A user 102 may use the system 100 to purchase clothing online. Generally, the system 100 uses machine learning to analyze images of articles of clothing and images of human models and to simulate the appearance and fit of different combinations of the articles of clothing on the human models. The system 100 may then present images showing how the combinations of articles of clothing would look when worn by the human models, which allows the user 102 to make a more informed purchasing decision, in certain embodiments.

The user 102 uses the device 104 to simulate the appearance and look of combinations of articles of clothing on humans. The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 includes a hardware processor 110, memory 112, or circuitry configured to perform any of the functions or actions of the device 104 described herein. For example, a software application designed using software code may be stored in the memory 112 and executed by the processor 110 to perform the functions of the device 104.

The processor 110 is any electronic circuitry, including, but not limited to one or a combination of microprocessors, microcontrollers, application specific integrated circuits (ASIC), application specific instruction set processor (ASIP), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the device 104 by processing information (e.g., information received from the user 102, network 106, and memory 112. The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 108 may store images 114 that may be retrieved by the device 104 through the network 106. For example, the database 108 may receive requests for one or more of the stored images 114 from the device 104. The database 108 may respond to these requests by retrieving and communicating the requested images 114 to the device 104. For example, the device 104 may request images of humans and images of articles of clothing from the database 108. In response, the database 108 may communicate the requested images of humans and the requested images of articles of clothing to the device 104.

The device 104 may allow the user 102 to purchase clothing online or in a physical store. The device 104 also provides an outfit simulation feature that simulates the appearance and fit of combinations of articles of clothing on human models. The device may receive images 116 of humans and images 118 of articles of clothing. The device 104 may retrieve the images 116 of humans and the images 118 of articles of clothing from the database 108. For example, the device 104 may communicate requests for the images 116 of humans and the images 118 of articles of clothing to the database 108. In response to these requests, the database 108 retrieves and communicates the images 116 of humans and the images 118 of articles of clothing to the device 104.

In some embodiments, the device 104 performs curation to determine which images 118 of articles of clothing to retrieve. For example, the user 102 may express interest in a particular article of clothing, and the device 104 may use machine learning to predict other articles of clothing that pair well or look good with the article of clothing in which the user 102 is interested. The device 104 may then retrieve the images 118 of the other articles of clothing.

In certain embodiments, the device 104 automatically selects the images 116 of the humans based on information that the device 104 has about the body type of the user 102. For example, the device 104 may have information about the height, weight, and gender of the user 102. The device 104 may use that information to select images 116 of humans that have a similar height, weight, or gender to the user 102.

The device 104 uses machine learning to analyze the images 116 of the humans and the images 118 of articles of clothing. For example, the device 104 may use one or more neural networks to process the images 116 and 118. The device 104 may use the outputs of the neural networks to assemble models 120 of the humans shown in the images 116 wearing combinations of articles of clothing shown in the images 118. The device 104 may then generate and present output images 122 using the models 120. For example, the output images 122 may show the humans in the images 116 wearing the combinations of the articles of clothing in the images 118. The user 102 may view the output images 122 to see or approximate how the combinations of the articles of clothing would appear or fit on the user 102.

The device 104 may generate any suitable number of output images 122. For example, the device 104 may determine any number of combinations of articles of clothing and simulate the appearance of these combinations on any number of human models. The device 104 may then present these output images 122 for the user 102 to view. The user 102 may view these output images 122 to better understand how different combinations of articles of clothing would appear when assembled into an outfit.

In some embodiments, the device 104 may be located in a physical store and the user 102 may use the device 104 to see outfits from the store's existing or current inventory. For example, the device 104 may generate output images 122 of different models wearing combinations of articles of clothing available for purchase in the physical store. The user 102 may view these output images 122 to see the various outfits that can be assembled with the articles of clothing in the store, and if desired can request that the items be made available, e.g., in their size at a physical dressing room reserved for them, for try-on. In this way, the device 104 becomes a technique for creating and presenting virtual mannequins that enables physical store curators or merchandisers to create virtual collections of the store's inventory, and to facilitate the presentation of these virtual displays to customers visiting the store, or contemplating visiting.

Figure 2:
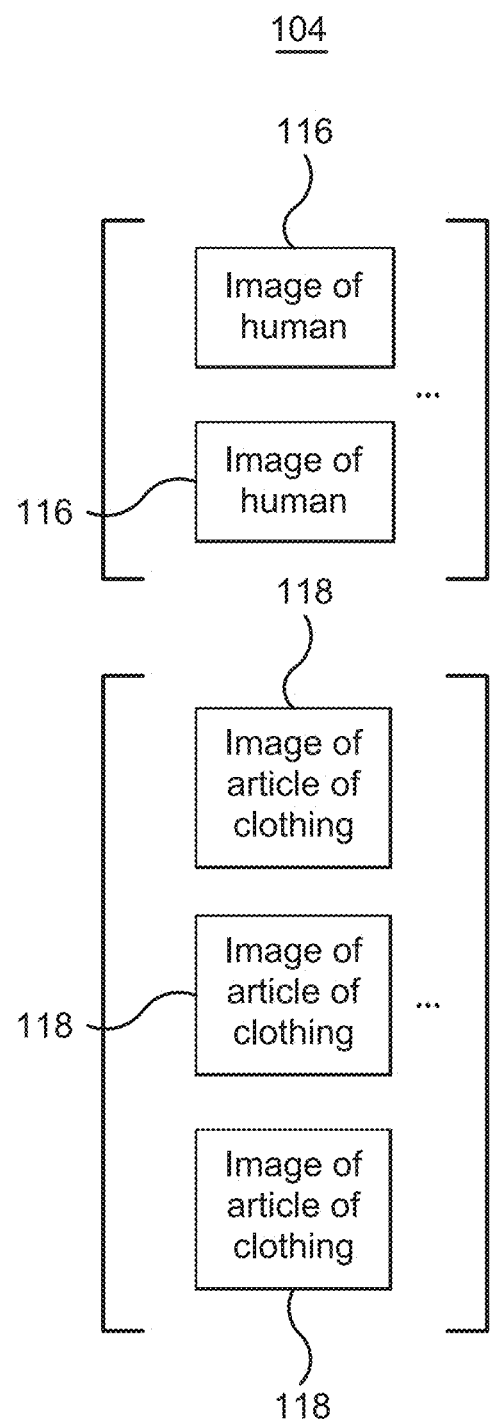
FIG. 2 illustrates an example device in the system of FIG. 1.

FIG. 2 illustrates an example device 104 in the system 100 of FIG. 1. Generally, FIG. 2 shows the device 104 receiving images 116 of humans and images 118 of articles of clothing. As discussed previously, the device 104 may receive the images 116 of humans and images 118 of articles of clothing from the database 108. The device 104 may retrieve the images 116 of humans and the images 118 of articles of clothing in response to the user 102 browsing or shopping for clothing online.

The humans in the images 116 may have different body types. For example, the humans may have different heights, weights, genders, skin tones, hair colors, or hair lengths. In some embodiments, the device 104 automatically retrieves the images 116 using information about the body type of the user 102. For example, the device 104 may have information about the height, weight, gender, or skin tone of the user 102. The device 104 may use this information and retrieves images 116 of humans that have similar heights, weights, gender, or body tone as the user 102.

The images 118 may show different articles of clothing. For example, the images 118 may show different shirts or different pairs of pants. Each image 118 may focus on a particular article of clothing. In some embodiments, the device 104 retrieves certain images 118 of articles of clothing through a curation feature in which the user 102 selects a particular article of clothing and the device 104 retrieves images 118 of articles of clothing that the device 104 predicts may pair well with the selected article of clothing. In certain embodiments, the user 102 may browse through the images 118 of the articles of clothing and select images 118 of articles of clothing that the user 102 is interested in purchasing. The device 104 may use machine learning to analyze the selections to simulate the appearance and fit of the selected articles of clothing on the humans in the images 116.

Figure 3:
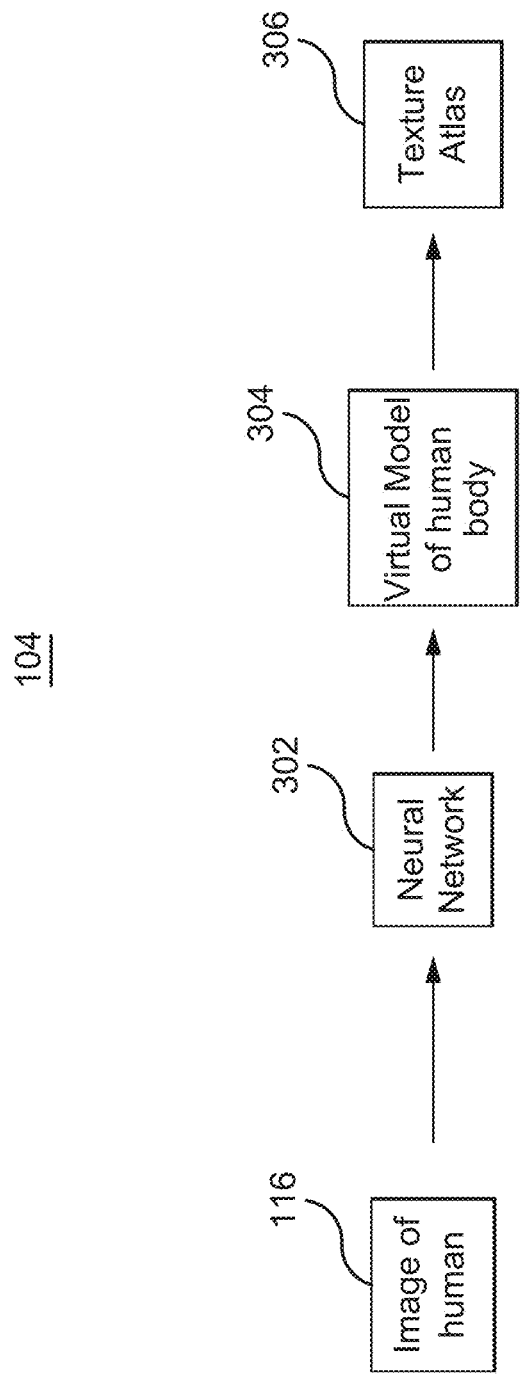
FIG. 3 illustrates an example device in the system of FIG. 1.

FIG. 3 illustrates an example device 104 in the system 100 of FIG. 1. Generally, FIG. 3 shows the device 104 using machine learning to analyze an image 116 of a human. The process shown in FIG. 3 may be repeated for any suitable number of images 116 of humans.

The device 104 uses one or more neural networks 302 to analyze the image 116. The one or more neural networks 302 may analyze the image 116 of the human to generate a virtual model 304 of the human body in the image 116. For example, the one or more neural networks 302 may segment the human from the image 116. The segment may show the boundaries of the human in the image 116. The one or more neural networks 302 may then analyze the segment to create the virtual model 304 of the human body. The virtual model 304 may be a three-dimensional model of the human body shown in the image 116, and the virtual model 304 may provide a mapping between the image 116 of the human and the three-dimensional model. For example, certain points on the virtual model 304 may be mapped to pixels on the image 116 of the human.

The device 104 may also generate a texture atlas 306 using the virtual model 304. Generally, the texture atlas 306 may be a flattened, two-dimensional representation of the virtual model 304. As a result, the texture atlas 306 includes a two-dimensional map showing correspondences between the pixels in the image 116 and a portion on the virtual model 304.

Figure 4:
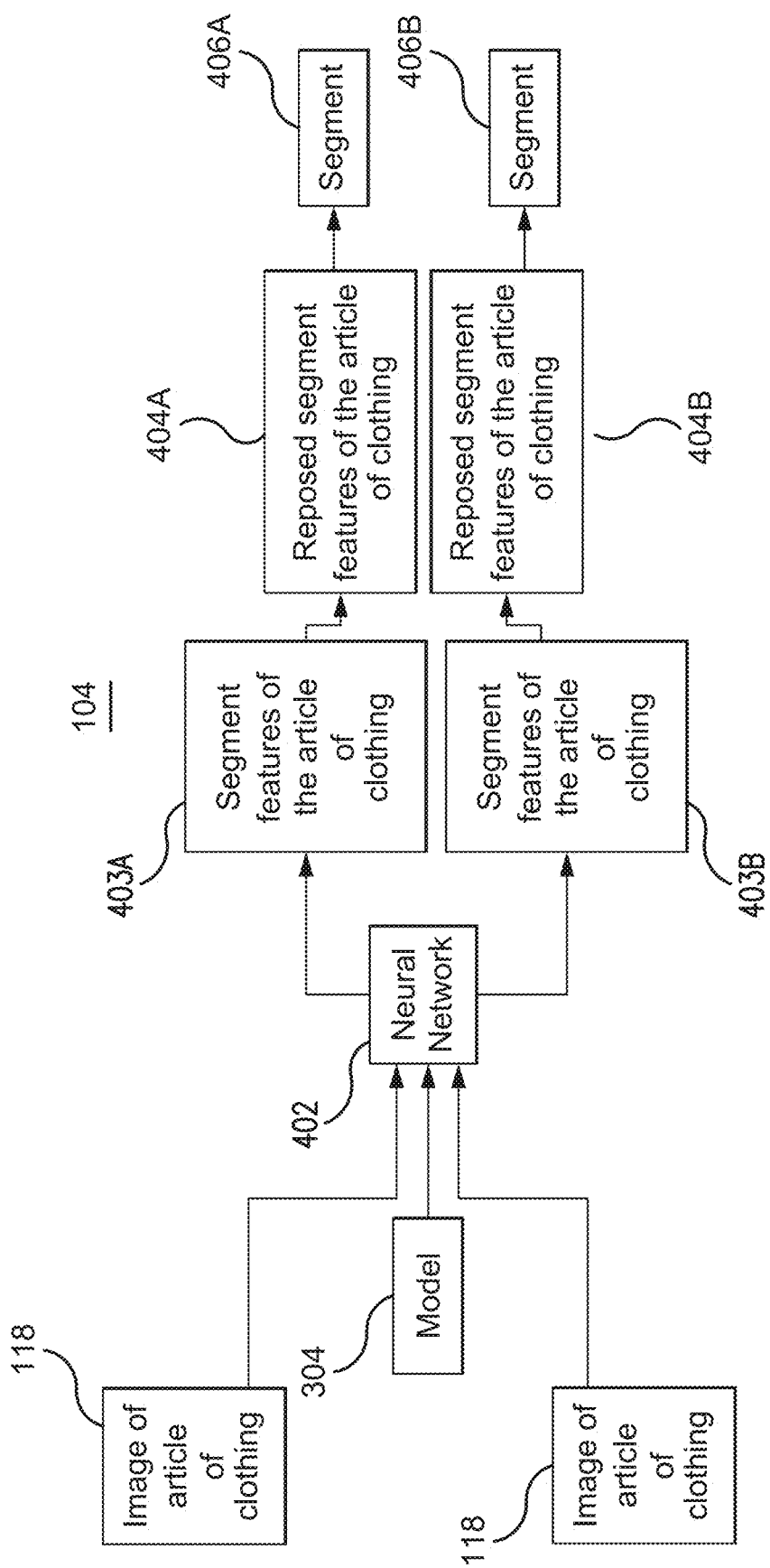
FIG. 4 illustrates an example device in the system of FIG. 1.

FIG. 4 illustrates an example device 104 in the system 100 of FIG. 1. Generally, FIG. 4 shows the device 104 generating segment features and segments from the images 118 of the articles of clothing. The process shown in FIG. 4 may be repeated for any number of combinations of images 118 of articles of clothing.

The device 104 may use one or more neural network 402 to analyze the images 118 of the articles of clothing to determine segment features 403 of the articles of clothing. For example, the images 118 of the articles of clothing may include an image 118 of a shirt and an image 118 of a pair of pants. The neural network 402 may analyze these images 118 to segment features 403A and 403B. The segment features 403A may indicate the area of the image 118 of the shirt that is occupied by the shirt, and the segment features 403B may indicate the area of the image 118 of the pants that is occupied by the pants. Thus, the segment features 403A and 403B may indicate that boundaries of the shirt and the pants in the images 118.

The one or more neural networks 402 may also repose the segment features 403A and 403B to produce reposed segment features 404 of the articles of clothing. The one or more neural networks 402 may resize and reorient the segment features 403A and 403B of the articles of clothing so that the segment features 403A and 403B of the articles of clothing fit on the corresponding part of the virtual model 304. In some embodiments, the device 104 may use the texture atlas 306 to repose the segment features 403A and 403B so that the segment features 403A and 403B fit on the virtual model 304. The resized or reoriented segment features 403A and 403B of the articles of clothing form the reposed segment features 404A and 404B, respectively. Thus, the reposed segment features 404A may indicate the boundaries of the shirt when the shirt is covering the torso of the virtual model 304, and the reposed segment features 404B may indicate the boundaries of the pants when the pants are covering the legs of the virtual model 304.

The device 104 then generates segments 406 of the articles of clothing using the reposed segment features 404. For example, the one or more neural networks 402 may extract or segment the reposed segment features 404 of the articles of clothing to generate the segments 406. The one or more neural networks 402 may extract the resized or reoriented segment features 404A of the shirt to generate a segment 406A of the shirt. The one or more neural networks 402 may extract or segment the resized or reoriented segment features 404B of the pair of pants to generate the segment 406B of the pair of pants.

Figure 5:
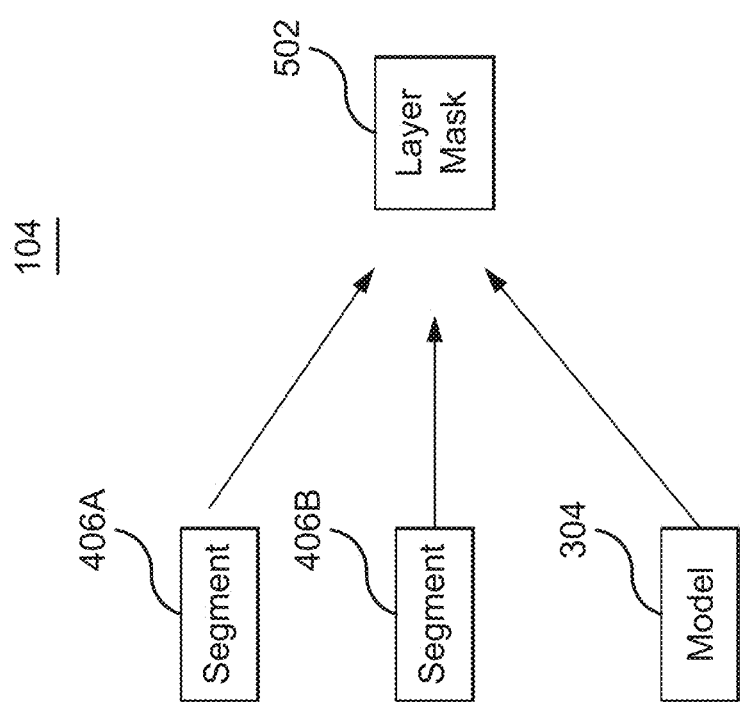
FIG. 5 illustrates an example device in the system of FIG. 1.

FIG. 5 illustrates an example device 104 in the system 100 of FIG. 1. Generally, FIG. 5 shows the device 104 generating a layer mask 502 using the segments 406 and the virtual model 304 of the human body. The process shown in FIG. 5 may be repeated to generate layer masks 502 for any suitable number of humans and combinations of articles of clothing.

The layer mask 502 indicates how the pixels of an output image of the human wearing the articles of clothing should be produced or sampled. For example, the layer mask 502 may indicate that pixels corresponding to the shirt should be produced by sampling according to the image 118 of the shirt. The layer mask 502 may also indicate that pixels corresponding to the pants should be produced by sampling according to the image 118 of the pair of pants. The layer mask 502 may also indicate that certain pixels corresponding to parts of the human body should be produced by sampling according to the image 116 of the human.

The device 104 may form the layer mask 502 using the segments 406 and the virtual model 304 of the human body. For example, the device 104 may layer the segments 406 onto the corresponding parts of the virtual model 304. The device 104 may then determine which parts of the virtual model 304 are covered by one or more of the segments 406 and which parts of the virtual model 304 are uncovered. The device 104 then generates the layer mask 502 using the virtual model 304 with the layered segments 406. The layer mask 502 will indicate that the parts of the virtual model 304 that are covered by a segment 406 should be produced by sampling according to a selected image 118 of an article of clothing. The layer mask 502 also indicates that the portions of the virtual model 304 that are uncovered should be produced by sampling according to the selected image 116 of the human. As a result, the layer mask 502 provides a map showing how certain portions of an output image should be produced.

Using the previous example, the device 104 may layer the segment 406A of the shirt and the segment 406B of the pair of pants onto the virtual model 304 of the human body. For example, the device 104 may layer the segment 406A of the shirt onto the torso of the virtual model 304 and the device 104 may layer the segment 406B of the pants onto the legs and waist of the virtual model 304. The device 104 may then determine the parts of the virtual model 304 that are covered by the segments 406A and 406B. The device 104 then generates the layer mask 502 based on the covered and uncovered portions of the virtual model 304. The layer mask 502 may indicate that certain portions of the torso of the virtual model 304 should be produced by sampling according to the selected image 118 of the shirt. The layer mask 502 may also indicate that certain portions of the legs of the virtual model 304 should be produced by sampling according to the selected image 118 of the pants. The layer mask 502 may also indicate that portions of the head of the virtual model 304 should be produced by sampling according to the selected image 116 of the human.

Figure 6:
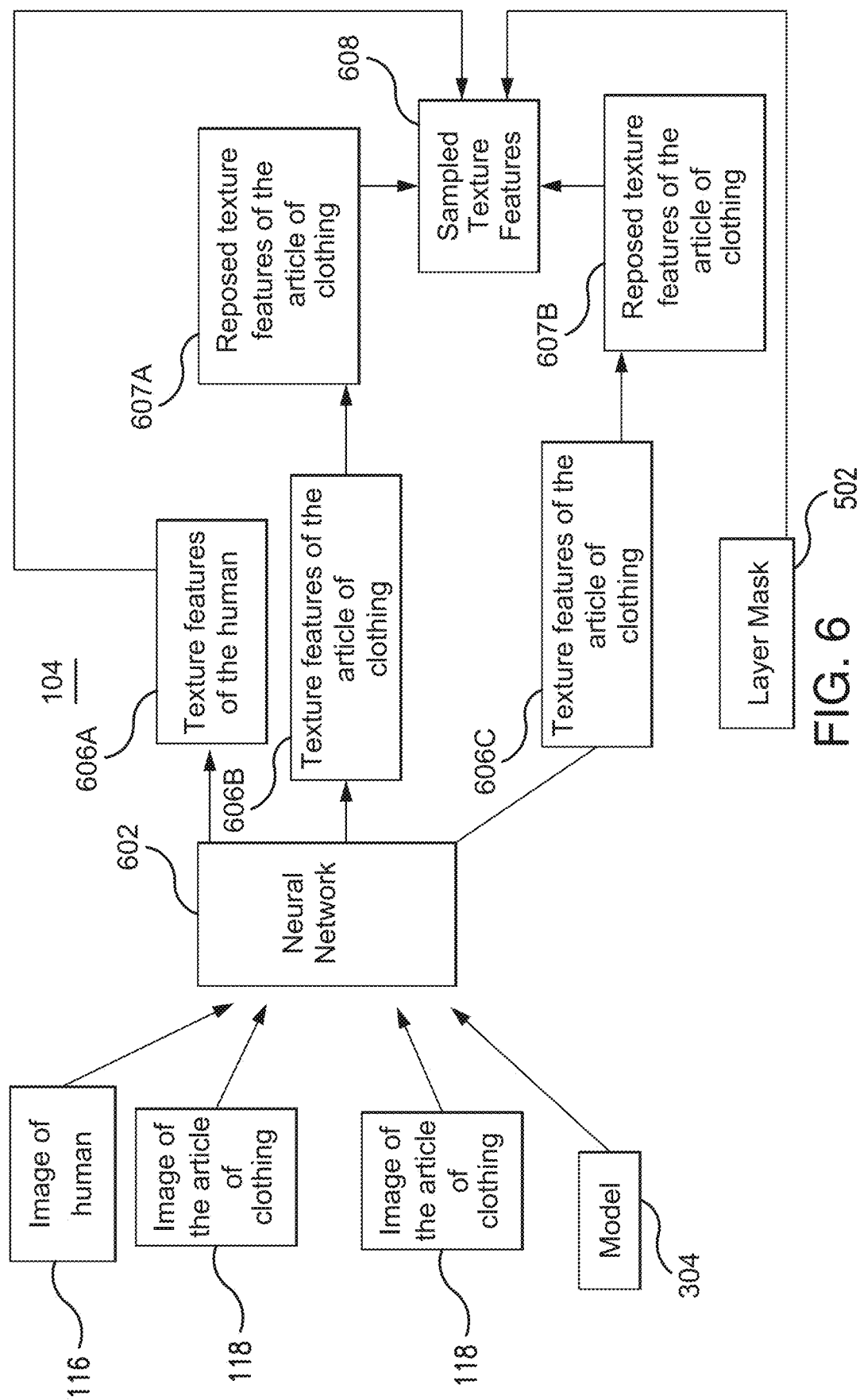
FIG. 6 illustrates an example device in the system of FIG. 1.

FIG. 6 illustrates an example device 104 in the system 100 of FIG. 1. Generally, FIG. 6 shows the device 104 sampling texture features of the articles of clothing or the human according to the layer mask 502. The process shown in FIG. 6 may be repeated to generate sampled texture features for any suitable number of images 116 of humans and combinations of articles of clothing.

The device 104 may process the image 116 of the human and the images 118 of the articles of clothing using one or more neural networks 602. The one or more neural networks 602 may generate texture features 606 from the image 116 of the human and the images 118 of the articles of clothing. In the example of FIG. 6, the one or more neural networks 602 generate the texture features 606A of the human from the image 116 of the human, the texture features 606B of the shirt from the image 118 of the shirt, and the texture features 606C of the pants from the image 118 of the pants. Each texture feature corresponds to a pixel in the image 116 of the human or an image 118 of an article of clothing. Each texture feature also encodes information about a small patch around that pixel. The texture features 606A, 606B, and 606C may resemble color warped versions of the image 116 of the human and the images 118 of the shirt and the pants. The color warping may indicate the encoded information in the texture features 606. Each pixel in the texture features 606A, 606B, and 606C may have a different color from the corresponding pixel in the image 116 or the image 118. The color difference may represent the encoded information of the small patch around the corresponding pixel in the image 116 or the image 118.

The device 104 may also use the one or more neural networks 602 to repose the texture features 606B and 606C of the articles of clothing. The one or more neural networks 602 may resize or reorient the texture features 606B and 606C of the articles of clothing so that the texture features 606B and 606C of the articles of clothing fit onto the virtual model 304 of the human. The resized or reoriented texture features 606B and 606C may form the reposed texture features 607A and 607B of the articles of clothing. The reposed texture features 607A and 607B may show the resized or reoriented texture features 606B and 606C of the articles of clothing on the virtual model 304.

The device 104 then samples the texture features 606A or the reposed texture features 607A and 607B according to the layer mask 502 to produce the sampled features 608. For example, if the layer mask 502 indicates that a portion of the head should be produced by sampling according to the image 116 of the human, then the device 104 may sample the portions of the head from the texture features 606A. As another example, if the layer mask 502 indicates that a certain portion of the torso should be produced by sampling according to the image 118 of the shirt, then the device 104 may sample the portion of the torso from the reposed texture features 607A of the shirt. As another example, if the layer mask 502 indicates that portions of the legs should be produced by sampling according to the image 118 of the pair of pants, then the device 104 samples the portions of the legs from the reposed texture features 607B of the pants. As a result, the sampled features 608 include samples from the texture features 606A and the reposed texture features 607A and 607B.

Figure 7:
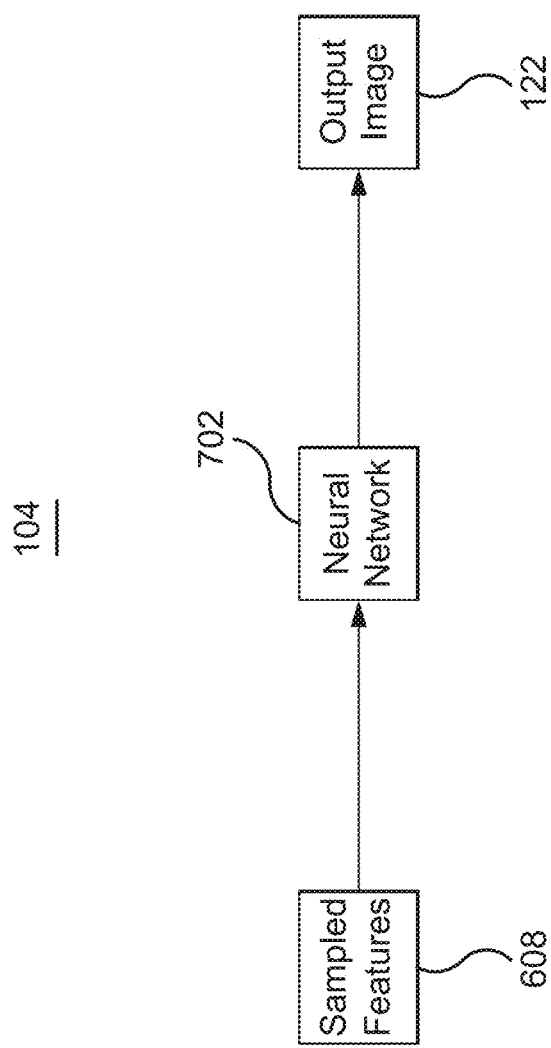
FIG. 7 illustrates an example device in the system of FIG. 1.

FIG. 7 illustrates an example device 104 in the system 100 of FIG. 1. Generally, FIG. 7 shows the device 104 producing the output image 122 from the sampled features 608. The device 104 may use one or more neural networks 702 to analyze the sampled features 608 to produce the output image 122. As discussed previously, the sampled features 608 may include color warping due to the processing done by the one or more neural networks 602 shown in FIG. 6. The one or more neural networks 702 may analyze the color of the sampled features 608 to generate the output image 122 with realistic colors that more closely match the colors shown in the image 116 of the human and the images 118 of the articles of clothing. As a result, the one or more neural networks 702 effectively reverse the color warping provided by the one or more neural networks 602 to provide a more realistic looking output image 122. A user 102 may then view the output image 122 on the device 104 to see how the selected articles of clothing would appear and fit on a body type similar to the body type of the user 102. A user 102 may then make a more informed purchasing decision for the articles of clothing, which reduces waste caused by returns, in certain embodiments.

In some embodiments, the device 104 uses the one or more neural networks 702 to sharpen features that appear on the articles of clothing in addition to setting the colors of the articles of clothing in the output image 122. For example, the device 104 may use the one or more neural networks 702 to sharpen the appearance of words, pictures, or logos that appear on the articles of clothing so that these words, pictures, or logos appear are more legible or are clearer in the output image 122.

Figure 8:
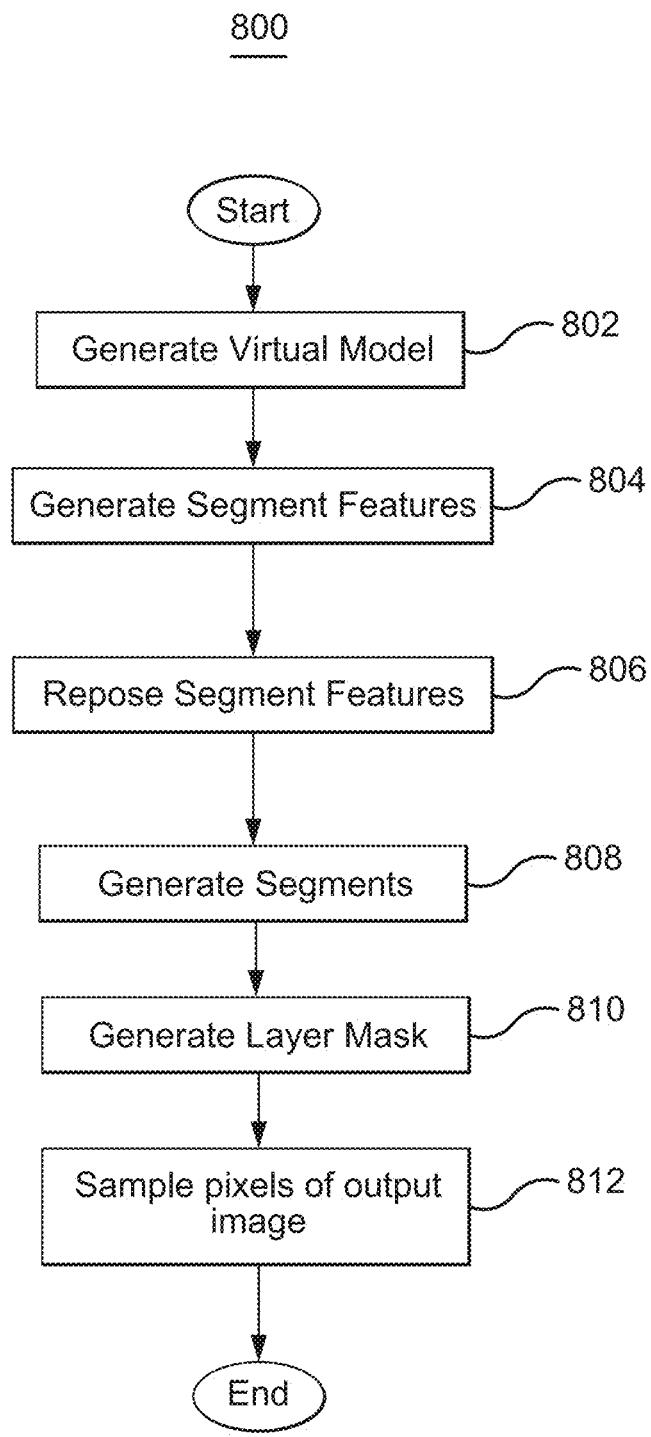
FIG. 8 is a flowchart of an example method performed in the system of FIG. 1.

FIG. 8 is a flow chart of an example method 800 performed in the system 100 of FIG. 1. In particular embodiments, the device 104 performs the method 800. By performing the method 800, the device 104 simulates the appearance and fit of combinations of articles of clothing on virtual models.

In block 802, the device 104 generates a virtual model 304 of a human body. The device 104 may receive images 116 of humans. The device 104 then uses one or more neural networks 302 to analyze the images 116 of the human to produce virtual models 304 of the human bodies in the images 116. The virtual models 304 may be three-dimensional models that map to the images 116 of the humans. For example, certain points on the three-dimensional models may map to pixels on the images 116 of the human. The remainder of this example will explain how the device 104 simulates the appearance and fit of a combination of articles of clothing on one of the virtual models 304. The process may be repeated for each model or for each combination of articles of clothing.

In block 804, the device 104 generates segment features 403 of articles of clothing. The device 104 may have received images 118 of the articles of clothing. For example, the device may have received an image 118 of a shirt and an image 118 of a pair of pants. The device 104 analyzes the images 118 of the articles of clothing using one or more neural networks 402 to determine the segment features 403 of the shirt and the pants in the images 118. The segment features 403 may indicate the boundaries of the shirt and the pants in their respective images 118.

In block 806, the device 104 uses the one or more neural networks 402 to repose the segment features 403. The one or more neural networks 402 may resize or reorient the segment features 403 of the shirt and the pants so that the segment features 403 fit onto the virtual model 304 of the human. The resized or reoriented segment features 403 form the reposed segment features 404. The reposed segment features 404 may show the resized or reoriented segment features 403 on the virtual model 304. In block 808, the device 104 extracts or segments the shirt and pants from the reposed segment features 404 to produce the segments 406 of the shirt and the pants.

In block 810, the device 104 generates the layer mask 502 using the segments 406 and the virtual model 304. The layer mask 502 may indicate how certain portions of an output image should be produced. The device 104 may generate the layer mask 502 by layering the segments 406 onto the virtual model 304. The layer mask 502 may indicate that the portions of the virtual model 304 covered by the segments 406 should be produced by sampling according to the images 118 of the articles of clothing and that the uncovered portions of the virtual model 304 should be produced by sampling according to the image 116 of the human.

In block 812, the device 104 produces pixels of the output image 122 according to the layer mask 502. In some embodiments, the device 104 may use one or more neural networks 602 to analyze the image 116 of the human and the images 118 of the articles of clothing to determine texture features 606 of the human and the articles of clothing. Each texture feature 606 may correspond to a pixel in the image 116 of the human or an image 118 of an article of clothing. Each texture feature 606 may also encode information of a small patch around the corresponding pixel in the image 116 or 118. As a result, the texture features 606 may form color warped versions of the image 116 of the human and the images 118 of the articles of clothing. The device 104 may also repose the texture features 606 for the articles of clothing by resizing or reorienting the texture features 606 for the articles of clothing so that the texture features 606 for the articles of clothing fit on the virtual model 304. The resized or reoriented texture features 606 of the articles of clothing form the reposed texture features 607 of the articles of clothing.

The device 104 produces pixels of the output image 122 according to the layer mask 502. If the layer mask 502 indicates that a pixel should be produced by sampling according to the image 116 of the human, then the device 104 samples the pixel from the texture features 606 of the human. If the layer mask 502 indicates that a pixel should be produced by sampling according to an image 118 of an article of clothing, then the device 104 may sample the pixel from the reposed texture feature 607 for that article of clothing. The sampling produces the sampled features 608.

The device 104 may then apply one or more neural networks 702 to the sampled features 608 to produce the output image 122. The one or more neural networks 702 may effectively reverse the color warping on the sampled texture features to produce a realistic output image 122. The user 102 may then view the output image 122 to see how the articles of clothing would appear and fit on a human. As a result, the user 102 may make a more informed purchasing decision, which reduces waste caused by returns.

Figure 9:
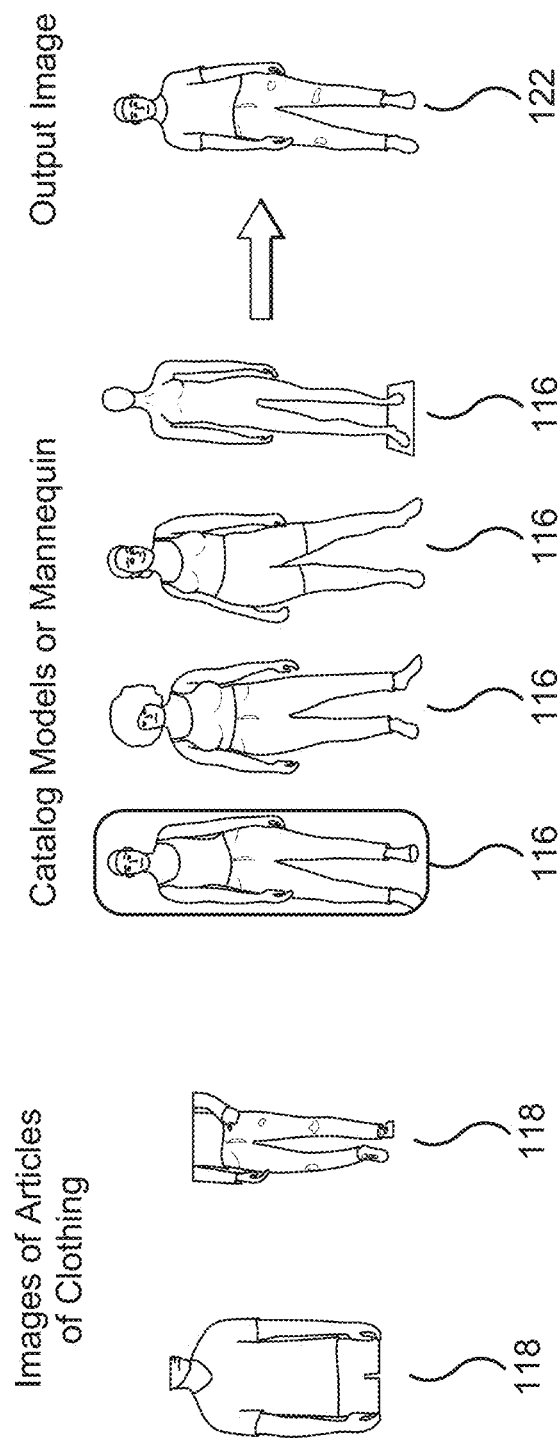
FIG. 9 illustrates example models and outfits in the system of FIG. 1.

FIG. 9 illustrates example models and outfits in the system 100 of FIG. 1. Specifically, FIG. 9 shows images 118 of articles of clothing and images 116 of humans (or a mannequin). The images 118 include an image 118 of a shirt and an image 118 of a pair of pants. The device 104 may produce the output image 122 that simulates the appearance and fit of the shirt and the pair of pants on a human shown in one of the images 116. As seen in FIG. 9, the output image 122 shows a human from an image 116 wearing the shirt and pants in the images 118.

Figure 10:
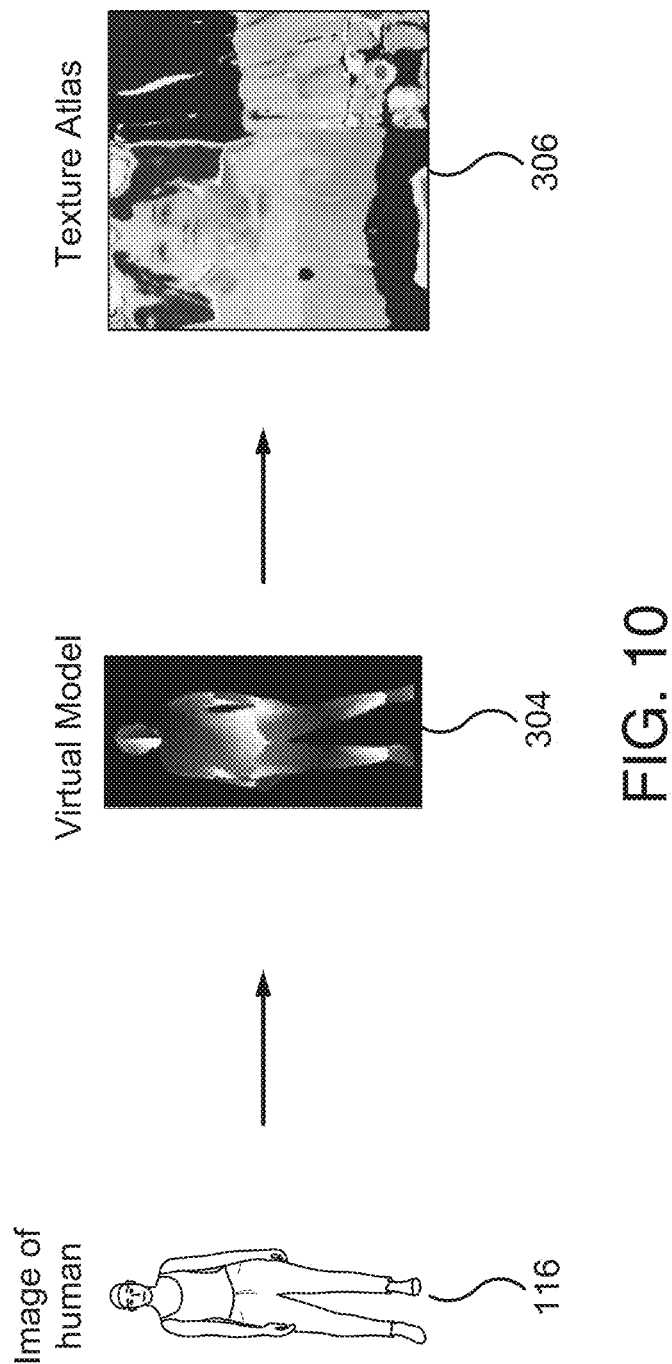
FIG. 10 illustrates an example generation of a virtual model and texture atlas in the system of FIG. 1.

FIG. 10 illustrates an example generation of a virtual model 304 and texture atlas 306. As seen in FIG. 10, the device 104 analyzes the image 116 of the human. The device 104 may use one or more neural networks 302 to analyze the image 116 of the human to generate the virtual model 304. The virtual model 304 may be a three-dimensional model of the human appearing in the image 116. The virtual model 304 may be sized, oriented, and posed like the human in the image 116. The device 104 may also generate the texture atlas 306 using the virtual model 304. The texture atlas 306 may be a flattened, two-dimensional representation of the virtual model 304. The texture atlas 306 may provide a mapping for the parts of the virtual model 304 to pixels in the image 116.

Figure 11:
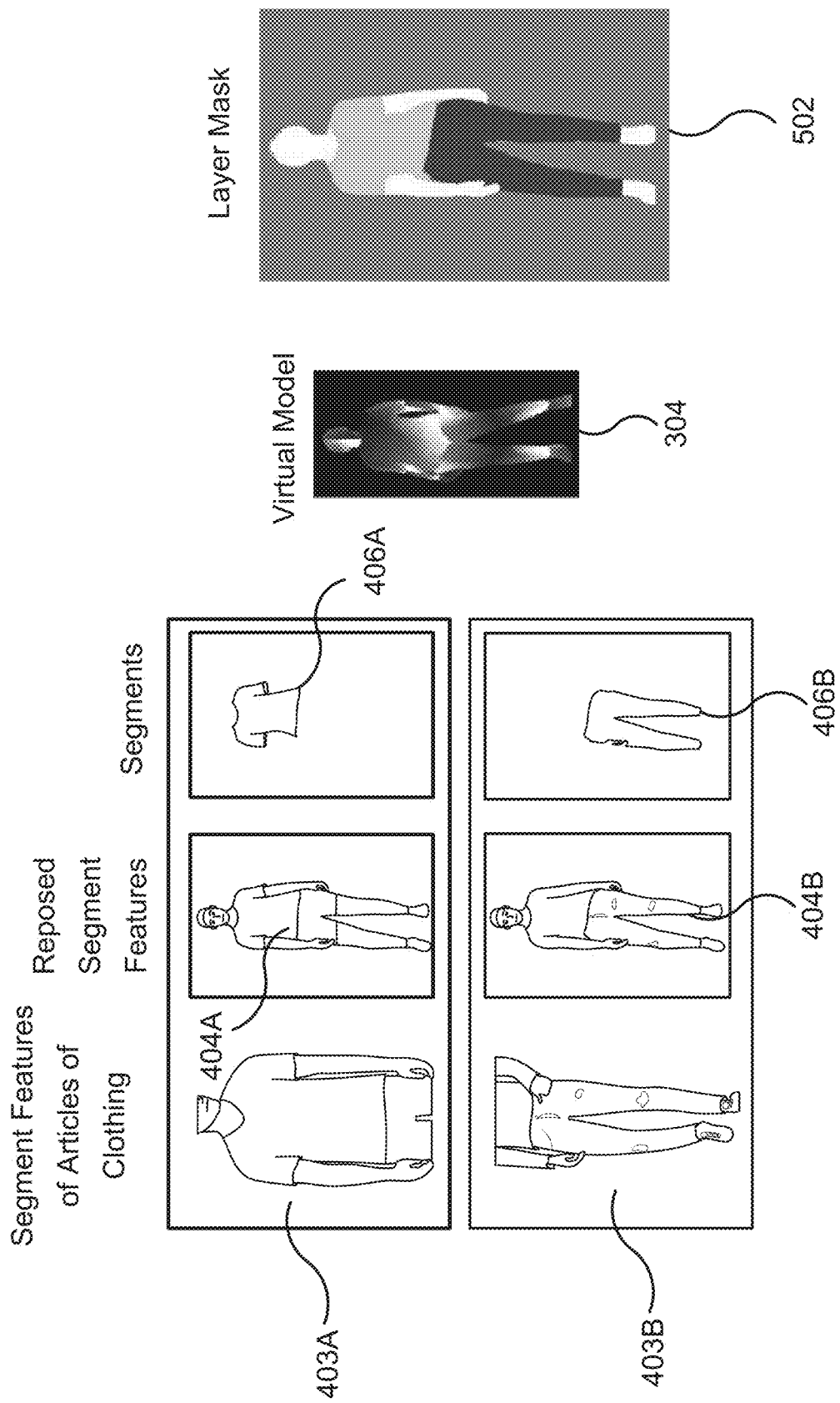
FIG. 11 illustrates an example generation of clothing segments and a layer mask in the system of FIG. 1.

FIG. 11 illustrates an example generation of clothing segments 406 and a layer mask 502. As seen in FIG. 11, the device 104 uses one or more neural networks 402 to generate segment features 403 of the shirt and the pants. The segment features 403 may indicate the boundaries of the shirt and the pants in their respective images 118. The one or more neural networks 402 may also repose the segment features 403 by resizing or reorienting the segment features 403 so that the segment features 403 fit on the virtual model 304. Reposing the segment features 403 forms the reposed segment features 404 of the shirt and the pants. The device 104 then extracts or segments the reposed segment features 404 of the shirt and the pants to produce segments 406 of the shirt and the pants.

The device 104 then uses the virtual model 304 and the segments 406 to produce the layer mask 502. As seen in FIG. 11, the layer mask 502 provides a mapping showing how certain pixels of the output image 122 should be produced. The device 104 may layer the segments 406 onto the virtual model 304 to determine how certain portions of the virtual model 304 should be produced. For example, the layer mask 502 may indicate that certain portions of the virtual model 304 covered by the segment 406A should be produced by sampling according to the image of the shirt. The layer mask 502 may also indicate that certain portions of the virtual model 304 covered by the segment 406B should be produced by sampling according to the image of the pair of pants. The layer mask 502 may also indicate that certain portions of the virtual model 304 that are uncovered should be produced by sampling according to the image of the human.

Figure 12:
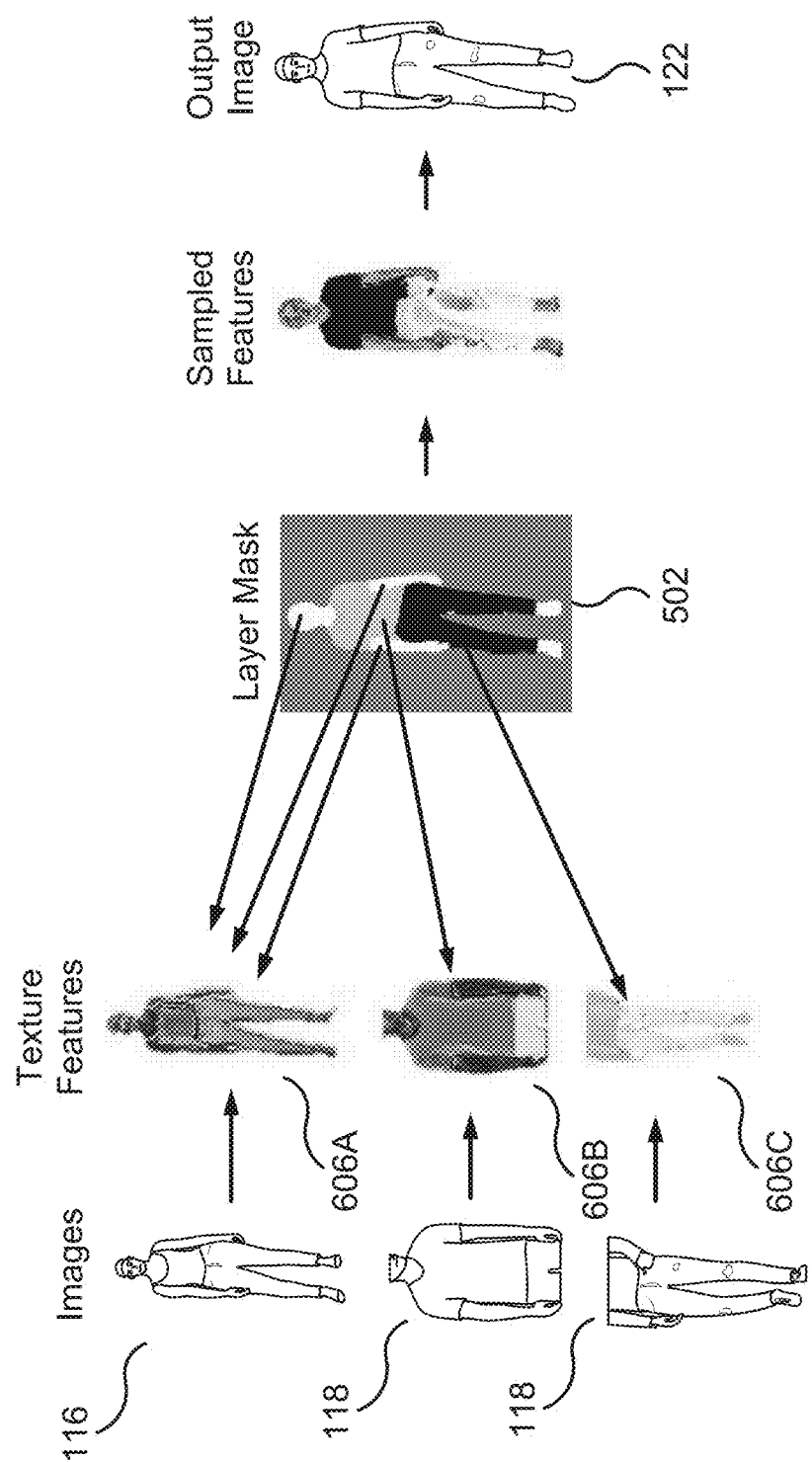
FIG. 12 illustrates an example generation of an output image in the system of FIG. 1.

FIG. 12 illustrates an example generation of the output image 122. As seen in FIG. 12, the device 104 produces sampled features 608 according to the layer mask 502. Specifically, the device 104 may have used one or more neural networks 602 to analyze the image 116 of the human and the images 118 of the articles of clothing to produce the texture features 606A of the human and the texture features 606B and 606C of the articles of clothing. The texture features 606A may include color warped versions of the image 116 of the human. The texture features 606B and 606C may include color warped versions of the shirt and the pants. In some embodiments, the device 104 reposes the texture features 606B and 606C so that the texture features 606B and 606C fit on the virtual model 304 to produce reposed texture features 607A and 607B.

The device 104 samples from the texture features 606A and the reposed texture features 607A and 607B according to the layer mask 502. For example, if the layer mask 502 indicates that a portion of the output image 122 should be produced by sampling according to the image 116 of the human, then the device 104 samples that portion from the texture features 606A. If the layer mask 502 indicates that a portion of the output image 122 should be produced by sampling according to the image 118 of the shirt, then the device 104 samples that portion from the reposed texture features 607A. If the layer mask 502 indicates that a portion should be produced by sampling according to the image 118 of the pants, then the device 104 samples the portion from the reposed texture features 607B.

The device 104 then uses one or more neural networks 702 to analyze the sampled features 608. The one or more neural networks 702 may generate the output image 122 from the sampled features 608. The one or more neural networks 702 may set the colors of the pixels of the output image 122 so that the output image 122 includes more realistic colors. As a result, the one or more neural networks 702 effectively alter the colors of the sampled features 608. The user 102 may then view the output image 122 on the device 104 to see how the shirt and the pants appear and fit on a human. As a result, the user 102 may make a more informed purchasing decision for the shirt and pants, which may reduce waste caused by returns, in certain embodiments.

In summary, the device 104 provides an outfit simulation feature that allows a user 102 to see, on the device 104, how an outfit with multiple articles of clothing will look before purchasing the outfit online. The device 104 may receive multiple images 118 of articles of clothing and images 116 of models with different body types. The device 104 then uses multiple neural networks to simulate the fit and appearance of different combinations of the articles of clothing on the models.

Specifically, for a combination of two articles of clothing (e.g., shirt and pants) and a model, the device 104 produces an output image 122 of the model wearing the two articles of clothing. By viewing the output image 122, the user 102 may see how the articles of clothing look when assembled into an outfit and how the outfit looks when worn by a person (e.g., a person with a body type similar to the user's body type). As a result, the device 104 improves the accuracy and realistic look of the outfit on the model, which may allow the user 102 to make a more informed outfit purchase and which may reduce waste caused by returns, in certain embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure describes a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A method comprising:
receiving, from a server, first two-dimensional image data representing a human body;
generating, using a first neural network, a three-dimensional virtual model of the human body based at least in part on the first two-dimensional image data representing the human body;
receiving, from a first database, second two-dimensional image data representing a first article of clothing and third two-dimensional image data representing a second article of clothing;
generating, using a second neural network, segment features of the first article of clothing based at least in part on the second two-dimensional image data representing the first article of clothing;
determining, using the second neural network, a first clothing type based on the segment features of the first article of clothing, wherein the first clothing type includes data relating to where the first article of clothing is worn;
generating, using the second neural network, segment features of the second article of clothing based at least in part on the third two-dimensional image data representing the second article of clothing;
determining, using the second neural network, a second clothing type based on the segment features of the second article of clothing, wherein the second clothing type includes data relating to where the second article of clothing is worn;
reposing, using the second neural network, the segment features of the first article of clothing based at least in part on the three-dimensional virtual model of the human body and the first clothing type;
reposing, using the second neural network, the segment features of the second article of clothing based at least in part on the three-dimensional virtual model of the human body and the second clothing type;
determining, using the second neural network and based on the first clothing type and the second clothing type, that the reposed segment features of the first article of clothing and the reposed segment features of the second article of clothing overlap and define an overlapping region;
determining, using the second neural network, clothing positioning comprising positioning of the first article of clothing and the second article of clothing, wherein the clothing positioning defines which pixels of the first article of clothing and which pixels the second article of clothing will be used as output pixels for the overlapping region;
generating, using the second neural network, based at least in part on the three-dimensional virtual model of the human body, the reposed segment features of the first article of clothing, the reposed segment features of the second article of clothing, and the clothing positioning, a layer mask indicating whether a plurality of output pixels of an output image should be produced according to the first two-dimensional image data representing the human body, the second two-dimensional image data representing the first article of clothing, or the third-two-dimensional image data representing the second article of clothing;
generating, using a third neural network, texture features of the human body based at least in part on the first two-dimensional image data representing the human body;
generating, using the third neural network, texture features of the first article of clothing based at least in part on the second two-dimensional image data representing the first article of clothing;

generating, using the third neural network, texture features of the second article of clothing based at least in part on the third two-dimensional image data representing the second article of clothing;

reposing, using the third neural network, the texture features of the first article of clothing based at least in part on the three-dimensional virtual model of the human body;

reposing, using the third neural network, the texture features of the second article of clothing based at least in part on the three-dimensional virtual model of the human body;

sampling, using the third neural network, the texture features of the human body, the reposed texture features of the first article of clothing, and the reposed texture features of the second article of clothing according to the layer mask; and producing, using a fourth neural network, the plurality of output pixels of the output image based at least in part on the sampled texture features of the human body, the sampled reposed texture features of the first article of clothing, and the sampled reposed texture features of the second article of clothing, wherein the output image shows the first article of clothing and the second article of clothing on the three-dimensional virtual model of the human body in the first two-dimensional image data representing the human body.

2. The method of claim 1, wherein generating the layer mask comprises:

generating, using the second neural network, a segment of the first article of clothing based at least in part on the reposed segment features of the first article of clothing; and generating, using the second neural network, a segment of the second article of clothing based at least in part on the reposed segment features of the second article of clothing, wherein the layer mask is generated based at least in part on the segment of the first article of clothing and the segment of the second article of clothing.

3. The method of claim 1, wherein reposing the texture features of the first article of clothing comprises resizing or reorienting the texture features of the first article of clothing to fit onto the three-dimensional virtual model of the human body.

4. The method of claim 1, wherein producing the plurality of output pixels of the output image comprises altering colors of the sampled texture features of the human body, the sampled reposed texture features of the first article of clothing, and the sampled reposed texture features of the second article of clothing.

5. A method comprising:

receiving, from a first server, first two-dimensional image data representing a human body;

generating, using at least one neural network executed by one or more processors, a three-dimensional virtual model of the human body based at least in part on the first two-dimensional image data representing the human body;

receiving, from a second server, second two-dimensional image data representing a first article of clothing and third two-dimensional image data representing a second article of clothing;

generating, using the at least one neural network executed by the one or more processors, segment features of the first article of clothing based at least in part on the second two-dimensional image data representing the first article of clothing;

determining, using the at least one neural network executed by the one or more processors, a first clothing type based on the segment features of the first article of clothing, wherein the first clothing type includes data relating to where the first article of clothing is worn;

generating, using the at least one neural network executed by the one or more processors, segment features of the second article of clothing based at least in part on the third two-dimensional image data representing the second article of clothing;

determining, using the at least one neural network executed by the one or more processors, a second clothing type based on the segment features of the second article of clothing, wherein the second clothing type includes data relating to where the second article of clothing is worn;

reposing, using the at least one neural network executed by the one or more processors, the segment features of the first article of clothing based at least in part on the three-dimensional virtual model of the human body;

reposing, using the at least one neural network executed by the one or more processors, the segment features of the second article of clothing based at least in part on the three-dimensional virtual model of the human body;

determining, using the at least one neural network executed by the one or more processors and based on the first clothing type and the second clothing type, that segment features of the first article of clothing and the segment features of the second article of clothing overlap and define an overlapping region;

determining, using the at least one neural network executed by the one or more processors, clothing positioning comprising positioning of the first article of clothing and the second article of clothing, wherein the clothing positioning defines which pixels of the first article of clothing and which pixels the second article of clothing will be used as output pixels for the overlapping region;

generating, using the at least one neural network executed by the one or more processors, based at least in part on the three-dimensional virtual model of the human body, the segment features of the first article of clothing, the segment features of the second article of clothing, and the clothing positioning, a layer mask indicating whether a plurality of output pixels of an output image should be produced according to the first two-dimensional image data representing the human body, the second two-dimensional image data representing the first article of clothing, or the third two-dimensional image data representing the second article of clothing;

generating, using the at least one neural network executed by the one or more processors, texture features of the human body based at least in part on the first two-dimensional image data representing the human body;

generating, using the at least one neural network executed by the one or more processors, texture features of the first article of clothing based at least in part on the second two-dimensional image data representing the first article of clothing;

generating, using the at least one neural network executed by the one or more processors, texture features of the second article of clothing based at least in part on the third two-dimensional image data representing the second article of clothing;

reposing, using the at least one neural network executed by the one or more processors, the texture features of the first article of clothing based at least in part on the three-dimensional virtual model of the human body;
reposing, using the at least one neural network executed by the one or more processors, the texture features of the second article of clothing based at least in part on the three-dimensional virtual model of the human body;
sampling, using the at least one neural network executed by the one or more processors, the texture features of the human body, the reposed texture features of the first article of clothing, and the reposed texture features of the second article of clothing according to the layer mask; and
producing, using the at least one neural network executed by the one or more processors, the plurality of output pixels of the output image based at least in part on the sampled texture features of the human body, the sampled reposed texture features of the first article of clothing, and the sampled reposed texture features of the second article of clothing according to the layer mask, wherein the output image shows the first article of clothing and the second article of clothing on the three-dimensional virtual model of the human body in the first two-dimensional image data representing the human body.

6. The method of claim 5, further comprising:
generating, using the at least one neural network executed by the one or more processors, a segment of the first article of clothing based at least in part on the reposed segment features of the first article of clothing; and
generating, using the at least one neural network executed by the one or more processors, a segment of the second article of clothing based at least in part on the reposed segment features of the second article of clothing.

7. The method of claim 6, wherein the layer mask is generated based at least in part on the segment of the first article of clothing and the segment of the second article of clothing.

8. The method of claim 5, wherein reposing the segment features of the first article of clothing comprises resizing or reorienting the segment features of the first article of clothing to fit onto the three-dimensional virtual model of the human body.

9. The method of claim 5, wherein generating the output image comprises altering colors of the sampled texture features of the human body, the sampled reposed texture features of the first article of clothing, and the sampled reposed texture features of the second article of clothing.

10. A system comprising:
a memory;
at least one neural network executed by one or more processors; and
one or more processors communicatively coupled to the memory, the one or more processors configured to:
receive, from a first server, first two dimensional image data representing a human body;
generate, using the at least one neural network executed by the one or more processors, a three-dimensional virtual model of the human body based at least in part on the first two-dimensional image data representing the human body;
receive, from a second server, second two-dimensional image data representing a first article of clothing and third image data representing a second article of clothing;
generate, using the at least one neural network executed by the one or more processors, segment features of the first article of clothing based at least in part on the second two-dimensional image data representing the first article of clothing;
determine, using the at least one neural network executed by the one or more processors, a first clothing type based on the segment features of the first article of clothing, wherein the first clothing type includes data relating to where the first article of clothing is worn;
generate, using the at least one neural network executed by the one or more processors, segment features of the second article of clothing based at least in part on the second two dimensional image data representing the second article of clothing;
determine, using the at least one neural network executed by the one or more processors, a second clothing type based on the segment features of the second article of clothing, wherein the second clothing type includes data relating to where the second article of clothing is worn;
repose, using the at least one neural network executed by the one or more processors, the segment features of the first article of clothing based at least in part on the three-dimensional virtual model of the human body;
repose, using the at least one neural network executed by the one or more processors, the segment features of the second article of clothing based at least in part on the three-dimensional virtual model of the human body;
determine, using the at least one neural network executed by the one or more processors and based on the first clothing type and the second clothing type, that segment features of the first article of clothing and the segment features of the second article of clothing overlap and define an overlapping region;
determine, using the at least one neural network executed by the one or more processors, clothing positioning comprising positioning of the first article of clothing and the second article of clothing, wherein the clothing positioning defines which pixels of the first article of clothing and which pixels the second article of clothing will be used as output pixels for the overlapping region;
generate, using the at least one neural network executed by the one or more processors, based at least in part on the three-dimensional virtual model of the human body, the segment features of the first article of clothing, the segment features of the second article of clothing, and the clothing positioning, a layer mask indicating whether a plurality of output pixels of an output image should be produced according to the first two-dimensional image data representing the human body, the second two-dimensional image data representing the first article of clothing, or the third two-dimensional image data representing the second article of clothing;
generate, using the at least one neural network executed by the one or more processors, texture features of the human body based at least in part on the first two-dimensional image data representing the human body;
generate, using the at least one neural network executed by the one or more processors, texture features of the first article of clothing based at least in part on the second two-dimensional image data representing the first article of clothing;
generate, using the at least one neural network executed by the one or more processors, texture features of the second article of clothing based at least in part on the third two-dimensional image data representing the second article of clothing;

repose, using the at least one neural network executed by the one or more processors, the texture features of the first article of clothing based at least in part on the three-dimensional virtual model of the human body;

repose, using the at least one neural network executed by the one or more processors, the texture features of the second article of clothing based at least in part on the three-dimensional virtual model of the human body;

sample, using the at least one neural network executed by the one or more processors, the texture features of the human body, the reposed texture features of the first article of clothing, and the reposed texture features of the second article of clothing according to the layer mask;

produce, using the at least one neural network executed by the one or more processors, the plurality of output pixels of the output image according to the layer mask based at least in part on the sampled texture features of the human body, the sampled reposed texture features of the first article of clothing, and the sampled reposed texture features of the second article of clothing, wherein the output image shows the first article of clothing and the second article of clothing on the three-dimensional virtual model of the human body in the first two-dimensional image data representing the human body.

11. The system of claim 10, wherein the one or more processors are further configured to:

generate, using the at least one neural network executed by the one or more processors, a segment of the first article of clothing based at least in part on the reposed segment features of the first article of clothing; and generate, using the at least one neural network executed by the one or more processors, a segment of the second article of clothing based at least in part on the reposed segment features of the second article of clothing.

12. The system of claim 11, wherein the layer mask is generated based at least in part on the segment of the first article of clothing and the segment of the second article of clothing.

13. The system of claim 10, wherein reposing the segment features of the first article of clothing comprises resizing or reorienting the segment features of the first article of clothing to fit onto the three-dimensional virtual model of the human body.

14. The system of claim 10, wherein generating the output image comprises altering colors of the sampled texture features of the human body, the sampled reposed texture features of the first article of clothing, and the sampled reposed texture features of the second article of clothing.

* * * * *